Figure 1:
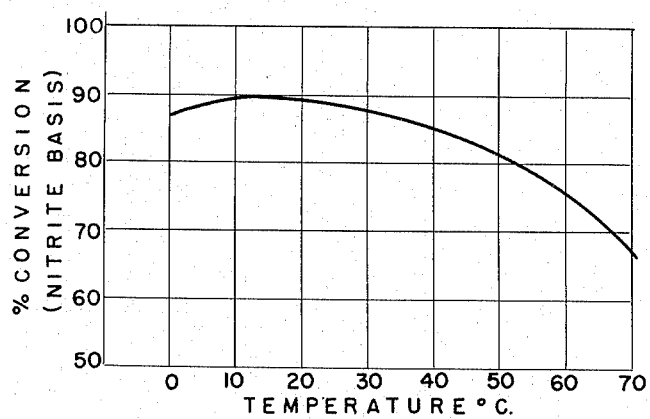

Jan. 17, 1956

G. R. CORAOR 2,731,499

PROCESS FOR PREPARING OXIMINOACETONE

Filed Feb. 5, 1954

INVENTOR

GEORGE R. CORAOR

BY Thos. A. Wilson

ATTORNEY

United States Patent Office 2,731,499
Patented Jan. 17, 1956

2,731,499

PROCESS FOR PREPARING OXIMINOACETONE

George R. Coraor, Woodbury, N. J., assignor to E. I. du Pont de Nemours and Company, Wilmington, Del., a corporation of Delaware Application February 5, 1954, Serial No. 408,385

3 Claims. (Cl. 260—566)

The present invention relates to an improved process for the preparation of oximinoacetone by the reaction of an alkyl nitrite with acetone.

A number of methods for preparing oximinoacetone have been reported in the literature. These methods include acidification of an aqueous solution of sodium nitroprusside and acetone, nitrosation and decarboxylation of ethyl acetoacetate, reaction of acetone with nitrosyl chloride, nitrosation of acetone with sodium nitrite and glacial acetic acid, and hydrochloric acid-catalyzed nitrosation of acetone with alkyl nitrites. Only the last of the above mentioned methods appears to be of practical importance. This method was reported by Claisen, Ber. 20, 252 (1887) and by Claisen and Marrasse, Ber. 22, 526 (1889). According to the above reports, conversions of less than 40% were obtained by heating to boiling equimolar quantities of acetone and the alkyl nitrite in the presence of the acid catalyst. The product was thus obtained in a very impure form, the loss in yield and the low purity being primarily due to the formation of methylglyoxal. Later investigators were unable to improve the described process. Thus, it is generally accepted that methyl groups are exceptionally difficult to nitrosate by any method (Touster, Organic Reactions, John Wiley and Sons).

In view of the demand for 2,5-dimethylpiperazine as an intermediate in the preparation of polyamides and the utility of oximinoacetone as a starting material for the synthesis of 2,5-dimethylpiperazine, a highly efficient and economical process for the preparation of oximinoacetone is desirable.

It is, accordingly, an object of the present invention to provide an improved process for the preparation of oximinoacetone. A further object is to provide such process which is characterized by high conversions and yields and also by high purity of the product. Additional objects will become apparent as the present invention is more fully described.

I have found that the foregoing objects are attained when I react acetone with an alkyl nitrite in the presence of hydrochloric acid at a temperature between 0° and 70° C. In carrying out the process of the present invention, I use an alkyl nitrite having at least three carbon atoms.

In order to illustrate more fully the present invention, reference is made to the following examples which represent specific embodiments, the invention not being limited thereto.

EXAMPLE 1

To a stirred solution of 465 grams of acetone and 5 milliliters of concentrated hydrochloric acid cooled in an ice bath, 178.4 grams of isopropyl nitrite was added dropwise. When the addition was completed, the isopropyl alcohol formed and the unreacted acetone were removed from the product under reduced pressure.

Oximinoacetone weighing 164 g. (94% conversion, nitrite basis) with a melting point of 61–64° C. was obtained. Recrystallization from an ether-petroleum ether mixture yielded white crystalline oximinoacetone having a melting point of 64.5–65° C.

In the foregoing example, the hydrochloric acid-nitrite weight ratio was 0.030:1 and the acetone-nitrite mole ratio was 4:1.

EXAMPLE 2

One half mole of isopropyl nitrite (44.6 g.) and 2.7 moles of acetone (156.4 g.) containing 5.9 g. of HCl were added simultaneously at measured rates to a helix-packed vertical jacketed column which provided a retention time of approximately 20 seconds, the reaction mixture then entering an ice-cooled receiver. The column was maintained at approximately 13° C. Forty-two grams of crude oximinoacetone melting at 56–62° C. remained after distillation under reduced pressure, representing a conversion of 97% based on the isopropyl nitrite introduced.

EXAMPLE 3

The following table illustrates the preparation of oximinoacetone by the reaction of isopropyl nitrite and acetone. In each case 44.6 grams of isopropyl nitrite (0.5 mole) was used, and the procedure followed was similar to that described in Example 1.

Table 1

| Acetone (mole) | Acetone/nitrite, mole ratio | HCl/nitrite, wt. ratio | Temp. (° C.) | Oximinoacetone (g.) | Percent conversion (nitrite) |
|---|---|---|---|---|---|
| 2 | 4 | 0.132 | 0 | 41.0 | 94 |
| 2 | 4 | 0.132 | 13 | 39.5 | 91 |
| 2 | 4 | 0.132 | 25 | 39.7 | 92 |
| 2 | 4 | 0.132 | 35 | 36.9 | 85 |
| 2 | 4 | 0.132 | 50 | 35.9 | 83 |
| 2 | 4 | 0.132 | 70 | 29.0 | 67 |
| 0.54 | 1.2 | 0.132 | 13 | 6.6 | 15 |
| 1 | 2 | 0.132 | 13 | 26.5 | 61 |
| 1.3 | 2.7 | 0.132 | 13 | 25.6 | 59 |
| 2.7 | 5.5 | 0.132 | 13 | 42.0 | 97 |
| 3.7 | 7.3 | 0.132 | 13 | 41.3 | 95 |
| 5.4 | 10.8 | 0.132 | 13 | 43.5 | 100 |
| 2 | 4 | 0.027 | 13 | 8.5 | 19 |
| 2 | 4 | 0.054 | 13 | 26.1 | 60 |
| 2 | 4 | 0.079 | 13 | 35.6 | 80 |
| 2 | 4 | 0.132 | 13 | 39.5 | 91 |

EXAMPLE 4

Sixty-one g. of n-butyl nitrite and 162 g. of acetone containing 9.5 ml. of concentrated HCl were added simultaneously over a period of 92 minutes to a packed reactor cooled to 20° C. The effluent was neutralized with concentrated aqueous ammonia, and the ammonium chloride removed by filtration. Butyl alcohol, water and excess acetone were removed by reduced pressure distillation. Oximinoacetone containing residual butyl alcohol was obtained in good yield.

EXAMPLE 5

Seventy and one-half g. of isoamyl nitrite and 213 g. of acetone containing 14 ml. of concentrated HCl were added simultaneously over a period of 95 minutes to a packed reactor cooled to 20° C. The effluent was neutralized with concentrated aqueous ammonia and the ammonium chloride removed by filtration. After reduced pressure distillation, a good yield of oximinoacetone containing residual isoamyl alcohol remained.

Figure 2:
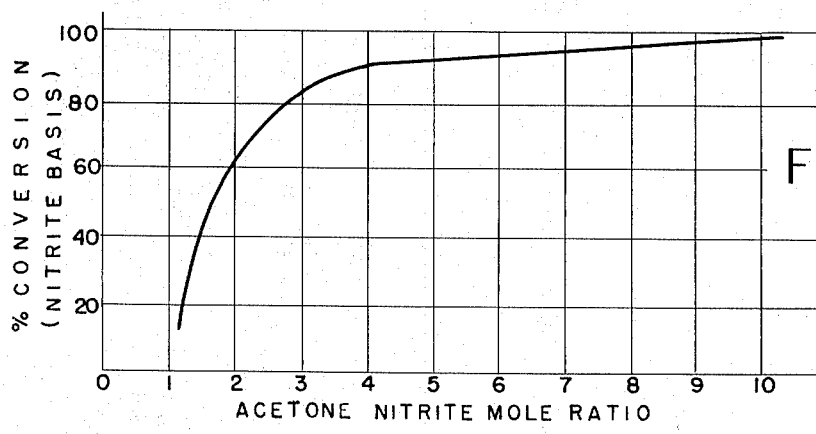

Figure 1 illustrates the effect of temperature upon conversion and Figure 2 illustrates the effect of the acetone/nitrite ratio on conversion. From these figures, it is apparent that the process is operative over a temperature range of from about 0° to 70° C., with optimum conversion being obtained between 0° and 30° C., and an acetone-nitrite mole ratio of at least 2 to 1. In the runs represented in each of the above figures, the hydrochloric acid-isopropyl nitrite ratio was 0.132 and the residence time was about twenty seconds. In the runs represented in Figure 1, the acetone/nitrite mole ratio was 4 to 1, and in the runs represented in Figure 2, the reaction temperature was 13° C.

Figure 3:
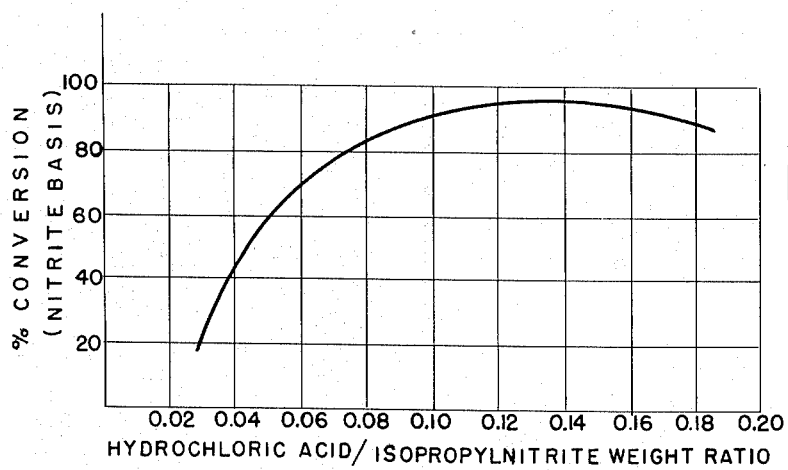

Figure 3 illustrates the effect of catalyst concentration on the conversion obtained. The runs represented in this figure were all made at a 4 to 1 acetone/nitrite mole ratio and at a twenty second residence time. The points making the curve were obtained from runs made at 13° C. From this figure, it is apparent that a hydrochloric acid-nitrite ratio of at least 0.05 is required for satisfactory conversion.

The use of the higher alkyl nitrites, i. e., those having at least three carbon atoms, is highly advantageous because pressure is not required to maintain a liquid phase reaction medium at the reaction temperatures, and because the higher alcohol produced by the reaction does not form an azeotrope with acetone, thus, a ready separation of the products is obtainable. In the case of either ethyl or methyl nitrite, on the other hand, pressure must be used to maintain a liquid phase reaction, the conditions of the reaction must be very carefully controlled, particularly with regard to contact time, in order to avoid decreased yields, and the products are difficult to separate because of azeotrope formation. Residence time is not critical in the case of the higher alkyl nitrites.

The failure of the prior art to achieve satisfactory results in the preparation of oximinoacetone is believed primarily due to the failure to discover the critical nature of the requirement of at least two moles of acetone per mole of nitrite. As shown in both Figure 2 and the table of Example 3, at a mole ratio of 1.2 to 1, the conversion, based on the nitrite introduced, was only about 15%.

The present invention has been fully described in the foregoing. I intend, therefore, to be limited only by the following claims.

I claim:

1. A process for producing oximinoacetone which comprises reacting an alkyl nitrite having at least three carbon atoms with acetone in the presence of a hydrochloric acid catalyst at a temperature between 0° and 70° C., the mole ratio of the acetone to the alkyl nitrite being at least 2 to 1 and the weight ratio of the acid catalyst to the alkyl nitrite being at least 0.05 to 1.

2. A process for producing oximinoacetone which comprises reacting isopropyl nitrite with acetone in the presence of a hydrochloric acid catalyst at a temperature between 0° and 30° C., the mole ratio of the acetone to the isopropyl nitrite being at least 2 to 1 and the weight ratio of the acid catalyst to the isopropyl nitrite being at least 0.05 to 1.

3. A process as claimed in claim 2, wherein the isopropyl nitrite and an acetone-acid catalyst solution are reacted in a continuous flow process.

References Cited in the file of this patent

Claisen et al.: Ber. Deut. Chem. 22, 526–30 (1889).